United States Patent [19]
Borst

[11] 3,762,896
[45] Oct. 2, 1973

[54] METHOD AND APPARATUS FOR PRODUCING FIBERS AND ENVIRONMENTAL CONTROL THEREFORE

[75] Inventor: John A. Borst, San Jose, Calif.

[73] Assignee: Owens-Corning Fiberglas Corporation, Toledo, Ohio

[22] Filed: Aug. 23, 1971

[21] Appl. No.: 173,946

[52] U.S. Cl. .............................. 65/3, 65/11 R, 65/29, 65/162, 264/121
[51] Int. Cl. ............................................. C03b 37/04
[58] Field of Search .................... 264/40, 121; 65/1, 65/2, 3, 11 R, 12, 29, 162; 55/473

[56] References Cited
UNITED STATES PATENTS

| 3,002,226 | 10/1961 | Warthen | 264/40 X |
|---|---|---|---|
| 3,347,648 | 10/1967 | Krakauer et al. | 65/3 |
| 3,374,074 | 3/1968 | Russell et al. | 65/12 X |
| 3,442,633 | 5/1969 | Perry | 65/3 |
| 3,518,814 | 7/1970 | Maynard | 55/473 X |

FOREIGN PATENTS OR APPLICATIONS

| 4,610,663 | 3/1971 | Japan | 264/40 |

Primary Examiner—Robert L. Lindsay, Jr.
Attorney—Carl G. Staelin et al.

[57] ABSTRACT

An improved method and apparatus for effecting environmental control in apparatus for producing fibers coated with a binder. Heat softened material such as glass is centrifuged into primary filaments which are subsequently attenuated into fibers by means of a high velocity gaseous blast. A vaporizable medium is applied to fibers by spraying for cooling the fibers, binder is subsequently applied to the cooled fibers and the mass of binder coated fibers are collected on a conveyor. An air stream is passed downwardly through the collected mass and the conveyor to cool the mass and to remove excessive binder. The temperature of the air stream is sensed by a thermocouple to determine the temperature of the mass and the sensed temperature is used to control application of the vaporizable medium to maintain the mass at a substantially constant predetermined low temperature.

15 Claims, 1 Drawing Figure

United States Patent [19]
Borst
[11] 3,762,896
[45] Oct. 2, 1973
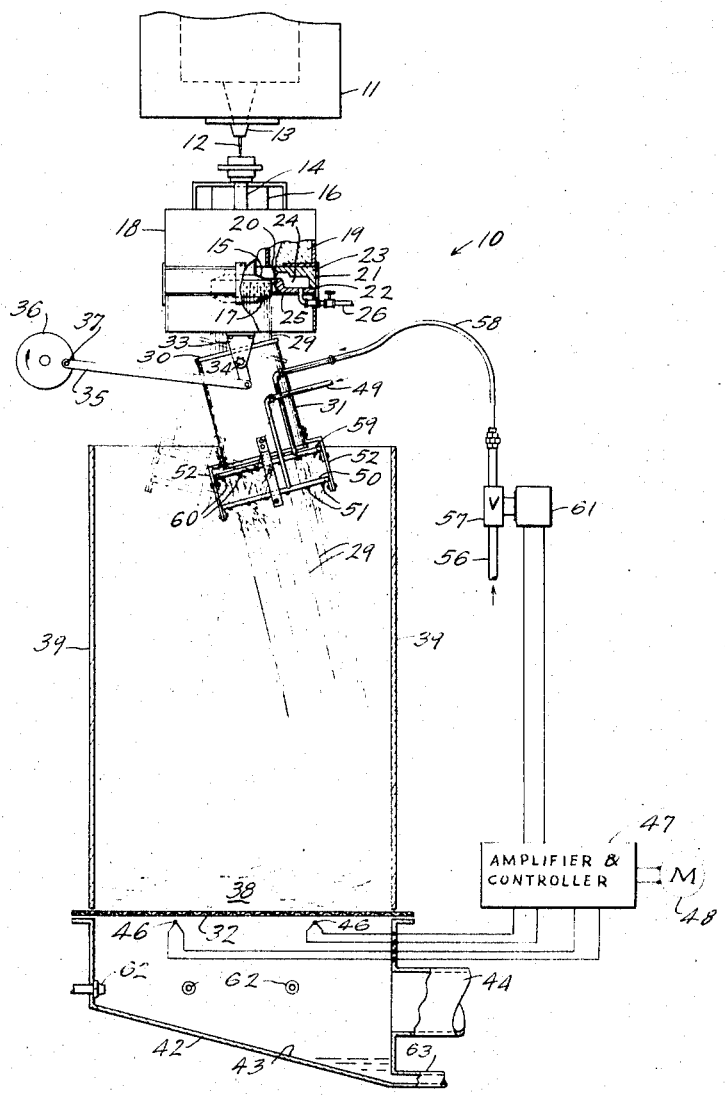

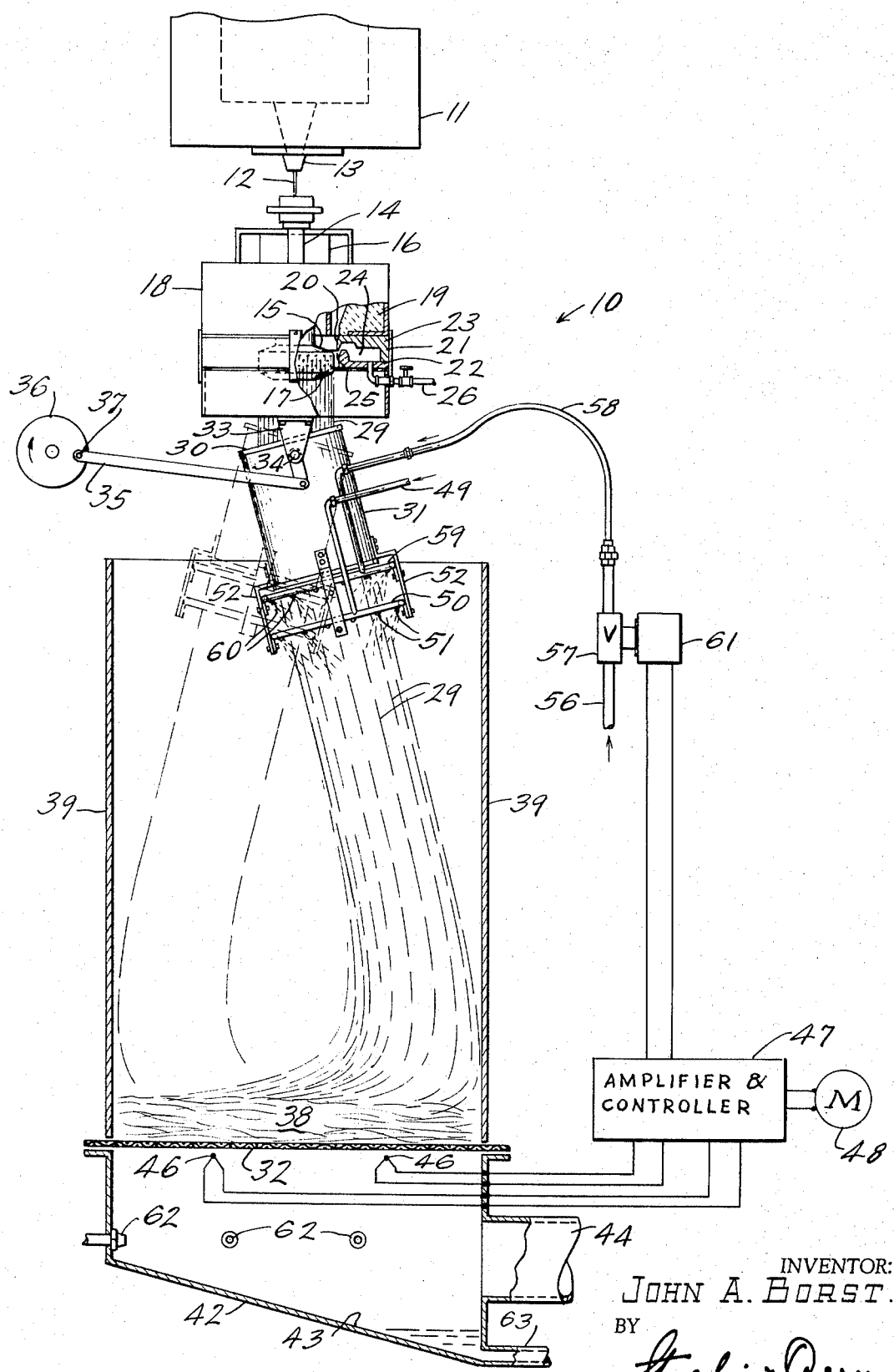

METHOD AND APPARATUS FOR PRODUCING FIBERS AND ENVIRONMENTAL CONTROL THEREFORE

BACKGROUND OF THE INVENTION

This invention relates to environmental control during the production of fibers from heat-softenable materials such as glass which are coated with an organic binder and more particularly to an improved method and apparatus for controlling the temperature of such fibers in a region in which the binder is applied to control undesirable vaporization and partial curing of the binder.

It has been conventional practice in forming fibers of glass, or other heat-softenable materials, by rotary process to deliver the heat softened or molten glass into a hollow spinner or centrifuge provided with a peripheral wall having a comparatively large number of orifices. Through high speed rotation of the spinner, the softened or molten glass is urged through the orifices by centrifugal forces to form bodies, streams or primary filaments of glass. The streams are then engaged by an annularly shaped gaseous blast and thereby attenuated into fibers which are entrained in the blast in the form of a hollow beam, column or veil of fibers.

In the fiber forming operation, it has been a usual practice to deliver or apply an uncured binder, such as phenol formaldehyde in solution form, to the newly attenuated fibers at a region below the attenuating region so that the fibers are thoroughly coated with the uncured binder. Fibers of this character are collected in a mass upon a moving conveyor. The collected mass is sized as to thickness to form a fibrous mat and the mat is conveyed through an oven or curing zone for setting the binder.

The fibers descending through the binder application region are typically at a temperature on the order of 500° F. to 600° F., or more, even though the zone in which the binder is applied to the fibers may be a substantial distance below the attenuating region. At such temperatures, excessive volatilization of the organic chemicals in the binder occurs and there is a tendency for the binder to be partially polymerized or cured. As a result, only binder compositions having a relatively high cure temperature have been satisfactory.

Although the effluent may be washed and filtered, at least some of the vaporized solvent and some binder particulates or solids are discharged into the atmosphere through a discharge stack connected through a suction blower arrangement beneath the region of collection of the fibers on the conveyor. The vaporized solvent and the organic particulates or binder solids delivered into the atmosphere are visually evident in the form of a dense chemical plume or cloud-like formation at the region of effluence from the discharge stack. This system has resulted in substantial waste of binder solvent and solids or particulates as well as promoting contamination of the atmosphere by reason of the effluence from the stack. As much as 20 percent or more of the binder has been lost in the past though volatilization during application and curing.

It has been suggested that the volatilization of the binder can be reduced by cooling the fibers prior to the application of binder. Cooling has been accomplished by spraying the hot fibers with atomized water particles. Vaporization of the water particles rapidly cools the fibers because of the high latent heat vaporization of water. However, some difficulties have occurred in cooling the fibers. If too much water is directed onto the fibers, the water will not be completely vaporized before the binder is applied. The binder may not adhere properly to the wet fibers and the collected mass of fibers will be soggy and, therefore, will not cure properly. If an insufficient amount of water is used, the fibers will not be cooled to the lowest practical temperature. In addition, variations and changes in various parameters will affect the temperature of the fibers, such as variations in the temperature and viscosity of the molten glass, variations in the speed of the spinner, variations in the force and temperature of the attenuating gas blast, and variations in the temperature and flow of water used for cooling the fibers. When variations occur in the fiber temperature, regardless of the cause, the binder must have a cure temperature determined by the highest fiber temperature. In addition, the cooling of the fibers will not be as effective in reducing effluent which causes air pollution.

SUMMARY OF THE INVENTION

According to the present invention, the temperature of glass fibers, and fibers from other heat-softenable materials, is controlled in a region in which binder is applied to the fibers by cooling the fibers with a controlled spray of water particles. As in the prior art, filaments are formed by a conventional method, as with a spinner, and the filaments are attenuated into fibers with a gaseous blast. The attenuated fibers are then coated with an organic binder, collected in a mass or "pack" on an endless foraminous conveyor, pressed into a mat and conveyed through a curing oven.

Prior to the application of binder, the attenuated fibers are cooled from perhaps 500° F. or 600° F., or more. Cooling of the fibers is accomplished by directing a controlled spray of water particles onto the fibers. The water particles are rapidly vaporized as they come in contact with the hot fibers. The relatively high latent heat of vaporization of water promotes rapid cooling of the fibers.

After the binder is applied to the fibers and the fibers are collected into a mass on the conveyor, the temperature of the pack is sensed, preferably by means of a thermocouple located immediately below the conveyor for sensing the temperature of air passed through the mass and the conveyor. The sensed temperatures is then used to control the water spray for maintaining a substantially constant fiber temperature in the region in which the binder is applied and downstream thereof. Controlling the fiber temperature by this technique minimizes temperature fluctuations. In addition, the fiber temperature can be maintained at a minimum temperature without the danger of applying excessive amounts of water which may leave the collected mass on the conveyor in a soggy condition. In a preferred form, the fibers are cooled such that the sensed temperature of the binder coated fibers on the conveyor is substantially constant and within the range of 115° F. to 150° F. If this temperature exceeds 180° F., there is a visually noticeable effluent from the apparatus. Maintenance of a substantially constant low temperature reduces the amount of binder vaporized when it is applied to the fibers and also permits the use of new binder compositions which have lower curing temperatures than binders currently in use.

Accordingly, it is an object of this invention to provide an improved method and apparatus for controlling the temperature of attenuated fibers in a region in which an organic binder is applied.

Another object of this invention is to reduce air pollution caused by the volatilization of organic binders as they are applied to fibers.

Another object of the invention is to reduce the cost of manufacturing glass fibers coated with an organic binder by reducing binder losses through volatilization of the binder.

Still another object of the invention is to control the temperature of fibers in a region in which a binder is applied to permit the use of organic binders having relatively low cure temperatures.

Still another object of the invention is to provide an improved method and apparatus for measuring the temperature of a mass of binder coated fibers deposited on a moving conveyor.

Other objects and advantages of the invention will become apparent from the following detailed description, with reference being made to the accompanying drawing.

BRIEF DESCRIPTION OF THE DRAWING

The single FIGURE shows in partial section apparatus embodying the principles of the present invention for forming binder coated fibers from glass and similar heat-softenable materials.

DESCRIPTION OF THE PREFERRED EMBODIMENTS

Referring now to the single FIGURE, apparatus 10 is shown for manufacturing binder coated glass fiber wool. Molten glass is delivered from a conventional glass melting furnace (not shown) to a forehearth 11. From the forehearth 11, a stream of molten glass 12 flows by gravity from a feeder 13 through a tubular member or quill 14 into a spinner or hollow rotor 15. The spinner 15 is supported by the tubular member 14 which is journaled to a housing 16. The tubular member 14 and the spinner 15 are rotated at a high speed by means of a conventional electric motor (not shown).

The molten glass 12 flows from the center of the tubular member 14 into the interior of the spinner 15. Centrifugal force caused by the high speed rotation of the spinner 15 urges the molten glass against an orificed peripheral wall 17 of the spinner 15, where the molten glass is extruded through the orificed wall. Glass emitting from the oridiced peripheral wall 17 is in the form of streams of glass.

The spinner 15 is surrounded by a circular housing 18 which supports a combustion burner 19. The combustion burner 19 defines an annular combustion chamber 20 which is shaped to direct hot gases from fuel combustion downwardly across the peripheral wall 17 of the spinner 15. The hot combustion gases maintain the streams in a softened condition. The housing 18 also supports a blower 21 comprising an annular body 22 and a cover member 23. The body 22 and cover member 23 define an annular manifold 24 which opens into an annular, downwardly directed throat 25. Compressed air or steam is delivered through a pipe 26 into the manifold 24. The compressed air or steam is emitted as a high velocity gaseous blast from the annular throat 25 to attenuate the streams into fine fibers. The fiberizing region or zone adjacent and immediately below the peripheral wall 17 of the spinner 15 is maintained at a temperature in the range of 1,600° F. to 2,000° F.

The attenuated fibers below the spinner 15 are in the form of a hollow or tubular veil 29. The veil 29 passes into the upper end 30 of a lapper or bucket 31 which distributes the fibers laterally across the upper flight of a moving foraminous endless belt conveyor 32. The lapper 31 is pivotally attached to the housing 18 by means of a pair of brackets 33 (only one shown) and stub shafts 34. An eccentric comprising a linkage arm 35 connected to a motor driven crank disk 36 by means of a pin 37 swings or oscillates the lapper 31. The lapper 31 is oscillated to uniformly distribute the fiber veil 29 as a mass 38 on the conveyor 32 between the walls of an enclosure 39 extending above the conveyor 32. The mass 38 on the conveyor 32 is conveyed through conventional compacting or sizing apparatus and a curing oven (not shown) where it is formed into a mat or board-like product.

A housing 42 is located below the conveyor 32 for defining a suction chamber 43. The suction chamber 43 is connected through an exhaust pipe 44 and a conventional suction blower (not shown) to an exhaust stack (not shown). The suction chamber 43 is maintained at a sub-atmospheric pressure to cause air to flow from an open upper end 45 of the enclosure 39 downwardly through the collected mass 38 and the foraminous conveyor 32. The downwardly directed flow of air in the enclosure 39 cools the mass of fibers 38 collected on the conveyor 32. Air drawn through the conveyor 32 has been heated by the fiber mass 38 to substantially the same temperature as the fiber mass 38. It has been found that by locating one or more thermocouples 46 immediately below the conveyor 32 to sense the temperature of air drawn through the mass of fibers 38 and the conveyor 32, the temperature of the moving mass 38 may be accurately measured. The thermocouples 46 are preferably located within ½ inch and 3 inches from the conveyor 32 for obtaining an accurate measurement. Heretofore, there has been not satisfactory method for measuring the temperature of a mass of fibers as they are collected on a moving conveyor. The thermocouples 46 are connected to an amplifier and controller 47 which includes conventional circuitry for amplifying the output of thermocouples and also may include a meter 48 for indicating the sensed temperature or apparatus for continuously recording the sensed temperature. If recording apparatus is provided, it may also record other information such as the ambient air temperature, the temperature of binder applied to the veil 29 and the temperature of water used to cool the veil 29.

After the veil of fibers 29 leaves the lapper 31, it is coated with an organic heat-curable binder, such as a phenol formaldehyde resin. The binder is delivered through a flexible supply tube 49 to a toroidal manifold 50. The manifold 50 is provided with a plurality of nozzles 51 for directing a spray of binder inwardly and downwardly onto the fiber veil 29. The manifold 50 is preferably attached to or suspended from the lapper 31 by means of a plurality of rigid support brackets 52 such that the manifold 50 moves with the lapper 31 as the lapper 31 is oscillated. The uncooled veil of fibers in the region in which the binder is applied is normally at a temperature of perhaps 500° F. to 600° F. The mass 38 of binder coated fibers collected on the conveyor 32, on the other hand, would normally be at a temperature on the order of 200° F. to 250° F. At these temperatures, a significant amount of the binder resin is vaporized as it contacts the hot glass. The binder vapors are drawn with air into the suction chamber 43 and exhausted to the atmosphere through the exhaust pipe 44 and the stack (not shown). This results in undesirable air pollution and in the loss of binder which can amount to a considerable expense. In addition, the heat of the fibers causes the remaining binder to partially cure before the mass 38 is compacted into mats or board-like products.

In accordance with the present invention, the fiber veil 29 is cooled prior to application of the binder. Cooling is accomplished by spraying the veil 29 with a vaporizable medium, preferably water. The vaporizable medium is supplied from a pressurized source (not shown) thorough a pipe 56, a control valve 57, a flexible tube 58 and a toroidal manifold 59. The manifold 59, like the manifold 50, is provided with a plurality of nozzles 60 for directing a spray of atomized particles of the heat vaporizable medium toward the descending fiber veil 29. The manifold 59 may be located at any convenient point between the manifold 50 and the fiberizing region in which the streams are attenuated into fibers. However, it is preferable to locate the manifold 59 between the bottom of the lapper 31 and the binder manifold 50. If the manifold is located in such a position, ordinary tap water may be used for cooling the fiber veil 29. If, on the other hand, the manifold 59 is located above the lapper 31 and near the fiberizing region, it may be necessary to use distilled water due to problems caused by mineral deposits in tap water. The intense heat in this region causes a portion of the spray to vaporize at the nozzles. Mineral deposits left by the vaporized water may eventually clog the nozzles. In addition, mineral deposits may collect on the lapper 31 if distilled water is not used. It will be readily apparent that other varporizable mediums may be used for cooling the fiber veil 29 to alleviate problems which may occur from mineral deposits when the manifold 59 is located too close to the fiberizing region and the spinner 15. However, the use of other vaporizable mediums will increase the cost of manufacturing the mass 38 and may possibly cause environmental control problems.

The control valve 57 located between the inlet pipe 56 and the tube 58 is of a conventional type. The control valve 57 is provided with an actuator 61 which opens and closes the valve 57 in response to a signal from the amplifier and controller 47. As the temperature of the mass 38 sensed by the thermocouples 46 increases, the amplifier and controlled 47 causes the actuator 61 to open the valve 57 to increase the quantity of water sprayed on the fiber veil 29. An increased flow of water cools the temperature of the fiber veil 29 in the region adjacent the binder manifold 50 and subsequently cools the mass 38 and the thermocouples 46. This procedure works in a reverse order if the thermocouples 46 sense a decrease in the temperature of the mass 38. Thus, the temperature of the fiber veil 29 and the mass 38 will reach a steady state condition. The actual temperature may be preset by controlling the amplifier and controller 47. In a preferred form, the temperature of the mass 38 is controlled to fall within the range of 115° F. to 150° F. If the temperature of the mass 38 is permitted to exceed 180° F., a visually noticeable cloud-like formation will appear above the discharge stack.

It has been found that by maintaining a substantially constant temperature in the mass of binder coated fibers 38, the efficiency and cost of producing the fiber mass 38, as well as the environment, are improved. By regulating the temperature of the mass 38 at 115° F., for example, a binder having a lower cure temperature may be used, with the possible savings in cost of the binder and improved properties in the binder. The lower temperature of the fiber veil 29 reduces considerably the quantity of binder volatilized as it comes in contact with the veil 29. This results in a reduction in air pollution by a factor as high as 10:1 or more. There is also a considerable savings in binder. In addition, when a binder having a lower cure temperature is used, the temperature of cure ovens, through which sized mats formed from the mass 38 are conveyed, can be reduced. This temperature reduction provides a savings in fuel expense.

Controlled cooling of the veil 29 has an additional benefit. Excess binder in the mass 38 is drawn with air through the conveyor 32 into the suction chamber 43. The air is generally washed with water prior to delivery to the stack to remove as much binder as possible. As shown in the drawing, a plurality of nozzles 62 are mounted in the housing 42 for washing air passing through the suction chamber 43 by means of a water spray discharged into the suction chamber 43. However, the nozzles 62 are positioned such that the spray will not contact the thermocouples 46 and cause an erroenous temperature reading. Particles of excess binder are removed from the air by water spray, which settles to the bottom of the housing 42. The settled water and excessive binder are then removed through a drain 63 and are subsequently used in the production of additional binder. The efficiency of the water spray for removing binder from the air is inversely dependent upon temperature. Controlled cooling of the mass 38 lowers the air temperature in the suction chamber 43, increasing the efficiency of the recovery of binder from the air.

It will be appreciated that various changes and modifications may be made in the invention without departing from the spirit and the scope of the appended claims. The The fiber forming apparatus 10 may, for example, be of the type wherein primary fibers are pulled from a bushing and attenuated with a hot gaseous blast. The attenuated fibers are then coated with a binder and collected on a conveyor. The fibers, of course, may also be formed from heat-softenable materials other than glass, for example, from thermoplastic synthetic resins. In addition, in its broadest aspect, the thermocouples may be replaced with other types of temperature sensors, such as an infrared sensor. The claimed method and apparatus for sensing temperatures are also suitable for sensing the temperature of porous masses of materials other than fibers. In addition, it will be recognized that the gas passed through the material for measuring the temperature of the material may be a gas used for treating the material.

What I claim is:

1. Apparatus for controlling the temperature of hot glass fibers being formed, coated with a binder and collected as a mass on a moving formainous surface comprising means for sensing the temperature of the moving mass of fibers, and means responsive to the sensed temperature for cooling the fibers to a substantially constant predetermined temperature prior to coating with a binder and collection on the surface.

2. Apparatus for forming binder coated glass fibers comprising, in combination, means for forming fibers from molten glass, means for cooling such fibers, means for coating the cooled fibers with a binder, foraminous conveyor means for collecting the coated fibers, means for sensing the temperature of the coated fibers collected on said conveyor means, and means responsive to the sensed temperature for controlling said cooling means to maintain the fibers at a substantially constant predetermined temperature in the region in which the fibers are coated with binder.

3. Apparatus for forming binder coated glass fibers, as set forth in claim 2, wherein said means for sensing the temperature of the coated fibers collected on said conveyor means includes means for flowing air through the collected coated fibers whereby the air is heated to substantially the same temperature of the heated air.

4. Apparatus for forming binder coated glass fibers, as set forth in claim 3, wherein said cooling means comprises means for directing a spray of water at the fibers whereby the fibers are cooled by vaporization of the water, and wherein said means for controlling said cooling means includes valve means for controlling the quantity of water sprayed by said cooling means and means for controlling said valve means in response to the sensed air temperature.

5. Apparatus for forming binder coated glass fibers, as set forth in claim 4, wherein said means for sensing the temperature of the heated air comprises at least one thermocouple.

6. Apparatus for forming binder coated glass fibers, as set forth in claim 3, wherein said means for sensing the temperature of the heated air comprises at least one thermocouple.

7. In apparatus including means for forming fibers from a heat-softened fiber-forming material, means for supplying a binder to the fibers and conveyor means for collecting the fibers and the binder, apparatus for controlling the temperature of the fibers in the region in which the binder is supplied comprising, in combination, means for directing a spray of vaporizable medium at the newly formed fibers prior to the supplying the binder to cool the fibers by vaporization of the medium, means for sensing the temperature of the collected fibers and binder, and means responsive to the sensed temperature for controlling the amount of vaporizable medium sprayed at the newly formed fibers to establish a predetermined desired fiber temperature level in the region in which the binder is supplied.

8. Apparatus for controlling the temperature of fibers in the region in which binder is supplied, as set forth in claim 7, wherein said vaporizable medium is water.

9. Apparatus for controlling the temperature of fibers in the region in which binder is supplied, as set forth in claim 7, including means for passing air through the collected fibers and binder to cool the collected fibers and binder, such air becoming heated to substantially the same temperature as the collected fibers and binder, and wherein said means for sensing the temperature of the collected fibers and binder comprises a sensor for sensing the temperature of such air passed through the collected fibers and binder to indicate the temperature of the fibers and binder.

10. Apparatus for controlling the temperature of fibers in the region in which binder is supplied, as set forth in claim 9, wherein said means for sensing the temperature of the collected fibers and binder includes at least one thermocouple.

11. Apparatus for controlling the temperature of fibers in the region in which binder is supplied, as set forth in claim 10, wherein said means for controlling the amount of vaporizable medium directed at the attenuated fibers includes valve means for controlling the amount of vaporizable medium supplied and control means responsive to the temperature sensed by said thermocouple for controlling said valve means.

12. Apparatus for controlling the temperature of fibers in the region in which binder is supplied, as set forth in claim 7, wherein said means for controlling the amount of vaporizable medium directed at the attenuated fibers includes valve means for controlling the amount of vaporizable medium supplied to the attenuated fibers and control means responsive to the sensed temperature for controlling said valve means.

13. A method for controlling the temperature of fibers newly formed from a heat-softened fiber-forming material in a region where a binder is applied to the fibers prior to collecting the fibers on a moving conveyor comprising the steps of: directing a vaporizable medium at the attenuated fibers prior to applying the binder whereby the fibers in the binder applying region are cooled by vaporization of the medium, sensing the temperature of the collected fibers and binder, and controlling the quantity of vaporizable medium directed at the fibers in response to the sensed temperature.

14. A method for controlling the temperature of fibers in a region to which binder is applied, as set forth in claim 13, wherein the temperature of the collected fibers and binder is sensed by passing air through the collected fibers and binder on the conveyor, and sensing the temperature of the air passed through the collected fibers and binder as a measure of the temperature of the collected fibers and binder.

15. A method for controlling the temperature of hot glass fibers which are continuously being formed, coated with a binder and collected as a mass on a moving foraminous surface comprising cooling the fibers prior to coating with the binder and collection on the surface, sensing the temperature of the collected coated mass, and regulating the rate of cooling of the fibers in response to the sensed temperature to establish a desired temperature of the coated mass being collected on the surface.

* * * * *